US012695953B2

(12) United States Patent
        Riepling

(10) Patent No.: US 12,695,953 B2
(45) Date of Patent: \*Jul. 28, 2026

(54) OVERRIDING MULTIMEDIA DEVICE

(71) Applicant: ROKU, INC., San Jose, CA (US)

(72) Inventor: Eric Casten Riepling, Soquel, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/914,952

(22) Filed: Oct. 14, 2024

(65) Prior Publication Data

US 2025/0039511 A1      Jan. 30, 2025

Related U.S. Application Data

(63) Continuation of application No. 18/498,622, filed on Oct. 31, 2023, now Pat. No. 12,170,824, which is a continuation of application No. 18/052,437, filed on Nov. 3, 2022, now Pat. No. 11,843,836, which is a continuation of application No. 17/337,063, filed on Jun. 2, 2021, now Pat. No. 11,523,189.

(51) Int. Cl.
| | |
|---|---|
| *H04N 21/478* | (2011.01) |
| *G06F 3/16* | (2006.01) |
| *G06N 20/00* | (2019.01) |
| *H04N 21/422* | (2011.01) |
| *H04N 21/4363* | (2011.01) |
| *H04N 21/443* | (2011.01) |

(52) U.S. Cl.
CPC ........... *H04N 21/478* (2013.01); *G06F 3/167* (2013.01); *G06N 20/00* (2019.01); *H04N*

*21/42203* (2013.01); *H04N 21/42222* (2013.01); *H04N 21/43635* (2013.01); *H04N 21/4436* (2013.01)

(58) Field of Classification Search
CPC ........... H04N 21/478; H04N 21/42203; H04N 21/42222; H04N 21/43635; H04N 21/4436; G06N 20/00; G06F 3/167
See application file for complete search history.

(56) References Cited

U.S. PATENT DOCUMENTS

| | | | | |
|---|---|---|---|---|
| 10,587,924 B2 * | 3/2020 | McElroy | ............... | G06F 16/435 |
| 11,523,189 B1 | 12/2022 | Riepling | | |
| 11,843,836 B2 | 12/2023 | Riepling | | |

(Continued)

*Primary Examiner* — Mulugeta Mengesha
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for switching the output of an overriding multimedia device from a first input to a second input or a combination of the first input and the second input. An example embodiment operates by receiving data relating to a multimedia switching event. The example embodiment further operates by determining that the data corresponds to a multimedia switching action. In response, the example embodiment operates by generating a multimedia switching actuation signal that instructs an overriding multimedia device to switch its output from the first multimedia signal to the second multimedia signal. Subsequently, the example embodiment operates by transmitting the multimedia switching actuation signal to the overriding multimedia device.

20 Claims, 6 Drawing Sheets

(56) References Cited

U.S. PATENT DOCUMENTS

| | | | |
|---|---|---|---|
| 2006/0001737 A1* | 1/2006 | Dawson | H04N 7/15 |
| | | | 348/E7.083 |
| 2014/0204277 A1* | 7/2014 | Adderly | H04N 21/43072 |
| | | | 348/731 |
| 2015/0113571 A1* | 4/2015 | Cholas | H04N 5/76 |
| | | | 725/59 |
| 2017/0060526 A1* | 3/2017 | Barton | H04R 5/04 |
| 2022/0394341 A1 | 12/2022 | Riepling | |
| 2023/0087599 A1 | 3/2023 | Riepling | |
| 2024/0064378 A1 | 2/2024 | Riepling | |

* cited by examiner

Computer-Implemented Method 500

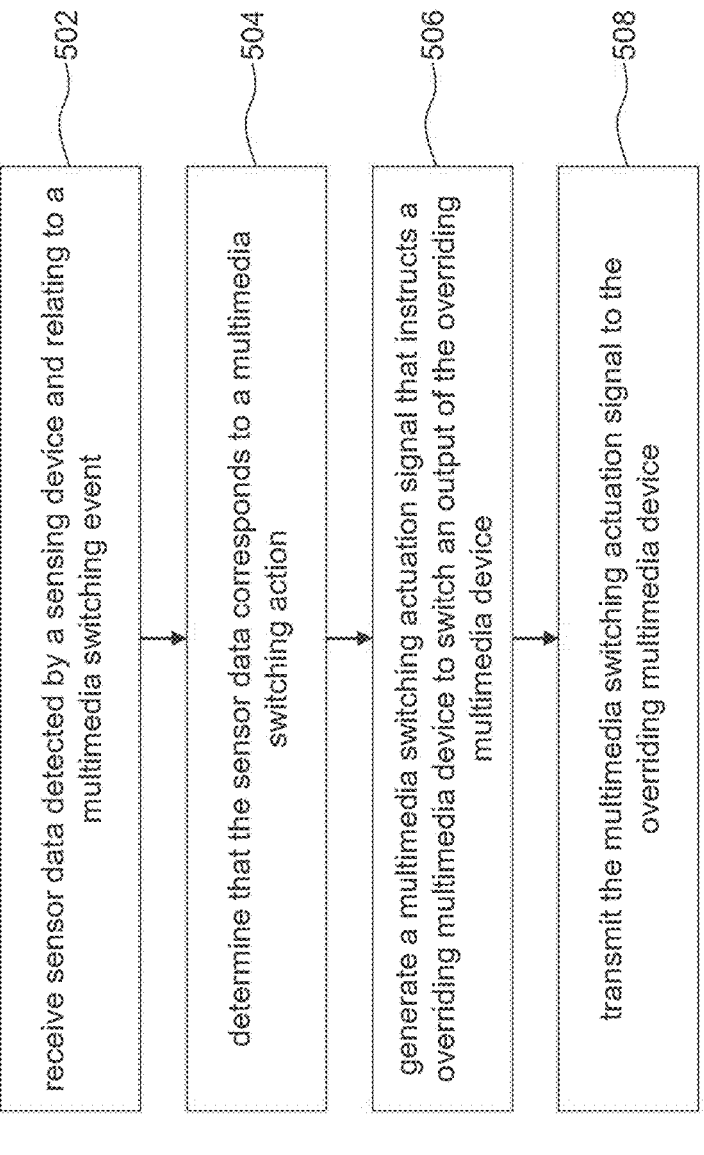

receive sensor data detected by a sensing device and relating to a multimedia switching event — 502 determine that the sensor data corresponds to a multimedia switching action — 504 generate a multimedia switching actuation signal that instructs a overriding multimedia device to switch an output of the overriding multimedia device — 506 transmit the multimedia switching actuation signal to the overriding multimedia device — 508

FIG. 5

OVERRIDING MULTIMEDIA DEVICE

CROSS REFERENCE TO RELATED APPLICATION

This application is a continuation of U.S. patent application Ser. No. 18/498,622, filed Oct. 31, 2023, now allowed, which is a continuation of U.S. patent application Ser. No. 18/052,437, filed Nov. 3, 2022, which is now U.S. Pat. No. 11,843,836, which is a continuation of U.S. patent application Ser. No. 17/337,063, filed Jun. 2, 2021, which is now U.S. Pat. No. 11,523,189, all of which are herein incorporated by reference in their entireties.

BACKGROUND

Field

This disclosure is generally directed to multimedia switching, and more particularly to High-Definition Multimedia Interface (HDMI) switching.

Content, such as a movie or television (TV) show, is typically displayed on a TV or other display screen for watching by users. Some TVs include integrated applications and inputs configured to receive and transmit multimedia (e.g., audio and video) signals from and to those applications and connected devices. In one example, an application or connected device can receive telephone calls. However, when such calls are received, managing input switching from the content that the user is watching to the incoming telephone call (e.g., through HDMI's Consumer Electronics Control (CEC) protocol) can be slow and problematic. Accordingly, to date, efforts to extend a user's experience to include receiving and making calls while watching content on the TV have been limited.

SUMMARY

Provided herein are system, apparatus, article of manufacture, method and/or computer program product embodiments, and/or combinations and sub-combinations thereof, for switching the output of an overriding multimedia device from a first input to a second input or a combination of the first input and the second input in response to, for example, a videoconference call or alert being received by a device connected to the second input. In one example, the disclosed embodiments provide for video calling when interacting with multiple devices connected to a TV via the HDMI protocol. In another example, the disclosed embodiments provide for displaying emergency alerts when interacting with multiple devices connected to a TV via the HDMI protocol.

An example embodiment includes an apparatus including a first multimedia input connector configured to connect to a first media device and receive a first multimedia signal from the first media device. The apparatus further includes a second multimedia input connector configured to connect to a second media device and receive a second multimedia signal from the second media device. The apparatus further includes a multimedia output connector configured to connect to a display device and transmit the first multimedia signal, the second multimedia signal, or a combination of the first multimedia signal and the second multimedia signal to the display device. The apparatus further includes an overriding multimedia device electrically coupled to the first multimedia input connector, the second multimedia input connector, and the multimedia output connector. The overriding multimedia device is configured to generate, at a first time, a first conductive electrical path between the first multimedia input connector and the multimedia output connector. The overriding multimedia device is further configured to receive a multimedia switching actuation signal. In response to a receipt of the multimedia switching actuation signal, the overriding multimedia device is configured to generate, at a second time later than the first time, a second conductive electrical path between the second multimedia input connector and the multimedia output connector.

Another example embodiment includes an apparatus including a memory configured to store priority multimedia input data that includes a first priority value for a first multimedia signal and a second priority value for a second multimedia signal. The apparatus further includes at least one processor coupled to the memory and configured to receive sensor data detected by a sensing device and relating to a multimedia switching event. The at least one processor is further configured to determine that the sensor data corresponds to a multimedia switching action based on a first determination that the sensor data has caused the second priority value to increase above the first priority value. In response to a second determination that the sensor data corresponds to the multimedia switching action, the at least one processor is further configured to generate a multimedia switching actuation signal configured to instruct an overriding multimedia device to switch an output of the overriding multimedia device from the first multimedia signal to the second multimedia signal. The at least one processor is further configured to transmit the multimedia switching actuation signal to the overriding multimedia device. In at least one embodiment, sensor data can include audio data, video data, input data (e.g., user input via remote control, motion data, emergency alert data, phone call), and/or environmental data (e.g., proximity detection, fire detector, assistant device data such as an alarm or timer).

Another example embodiment includes a non-transitory computer-readable medium having instructions stored thereon that, when executed by at least one computing device, cause the at least one computing device to perform operations that include receiving sensor data detected by a sensing device and relating to a multimedia switching event. The operations further include determining that the sensor data corresponds to a multimedia switching action by determining that the sensor data has caused a first priority value for a first multimedia signal to decrease below a second priority value for a second multimedia signal. In response to the determining that the sensor data corresponds to the multimedia switching action, the operations further include generating a multimedia switching actuation signal that instructs an overriding multimedia device to switch an output of the overriding multimedia device from the first multimedia signal to the second multimedia signal. The operations further include transmitting the multimedia switching actuation signal to the overriding multimedia device.

Another example embodiment includes a computer-implemented method that operates by receiving, by at least one processor, sensor data detected by a sensing device and relating to a multimedia switching event. The computer-implemented method further operates by determining, by the at least one processor, that the sensor data corresponds to a multimedia switching action by determining that the sensor data has caused a first priority value for a first multimedia signal to decrease below a second priority value for a second multimedia signal. In response to the determining that the sensor data corresponds to the multimedia switching action, the computer-implemented method further operates by generating, by the at least one processor, a multimedia switching actuation signal that instructs an overriding multimedia device to switch an output of the overriding multimedia device from the first multimedia signal to the second multimedia signal. The computer-implemented method further operates by transmitting, by the at least one processor, the multimedia switching actuation signal to the overriding multimedia device.

BRIEF DESCRIPTION OF THE FIGURES

The accompanying drawings are incorporated herein and form a part of the specification.

FIG. 5 is a flowchart illustrating a process for multimedia switching, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for switching the output of an overriding multimedia device from a first input to a second input or a combination of the first input and the second input in response to, for example, a videoconference call or alert being received by a device connected to the second input.

Figure 1:
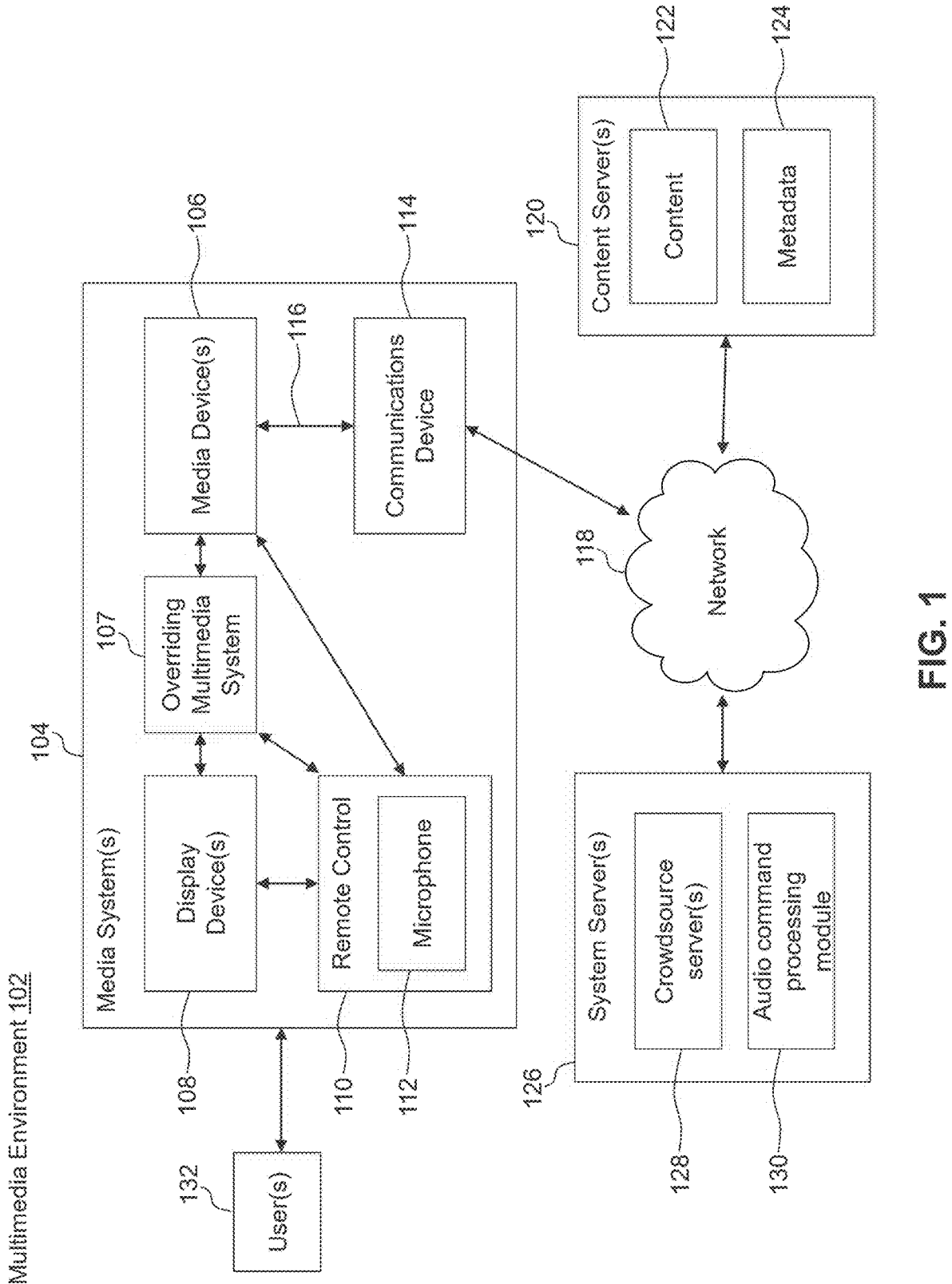
FIG. 1 illustrates a block diagram of a multimedia environment, according to some embodiments.

Various embodiments of this disclosure may be implemented using and/or may be part of a multimedia environment 102 shown in FIG. 1, in some embodiments. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108 via an overriding multimedia system 107. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108 via overriding multimedia system 107. For example, in some embodiments, the overriding multimedia system 107 may be integrated into the display device 108.

Each media device 106 may be configured to communicate with network 118 via a communications device 114. The communications device 114 may include, for example, a cable modem or satellite TV transceiver. The media device 106 may communicate with the communications device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106, overriding multimedia system 107, and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106, overriding multimedia system 107, and/or display device 108 using cellular, Bluetooth, infrared, etc., or any combination thereof. The remote control 110 may include a microphone 112, which is further described below.

The multimedia environment 102 may include a plurality of content servers 120 (also called content providers or sources). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
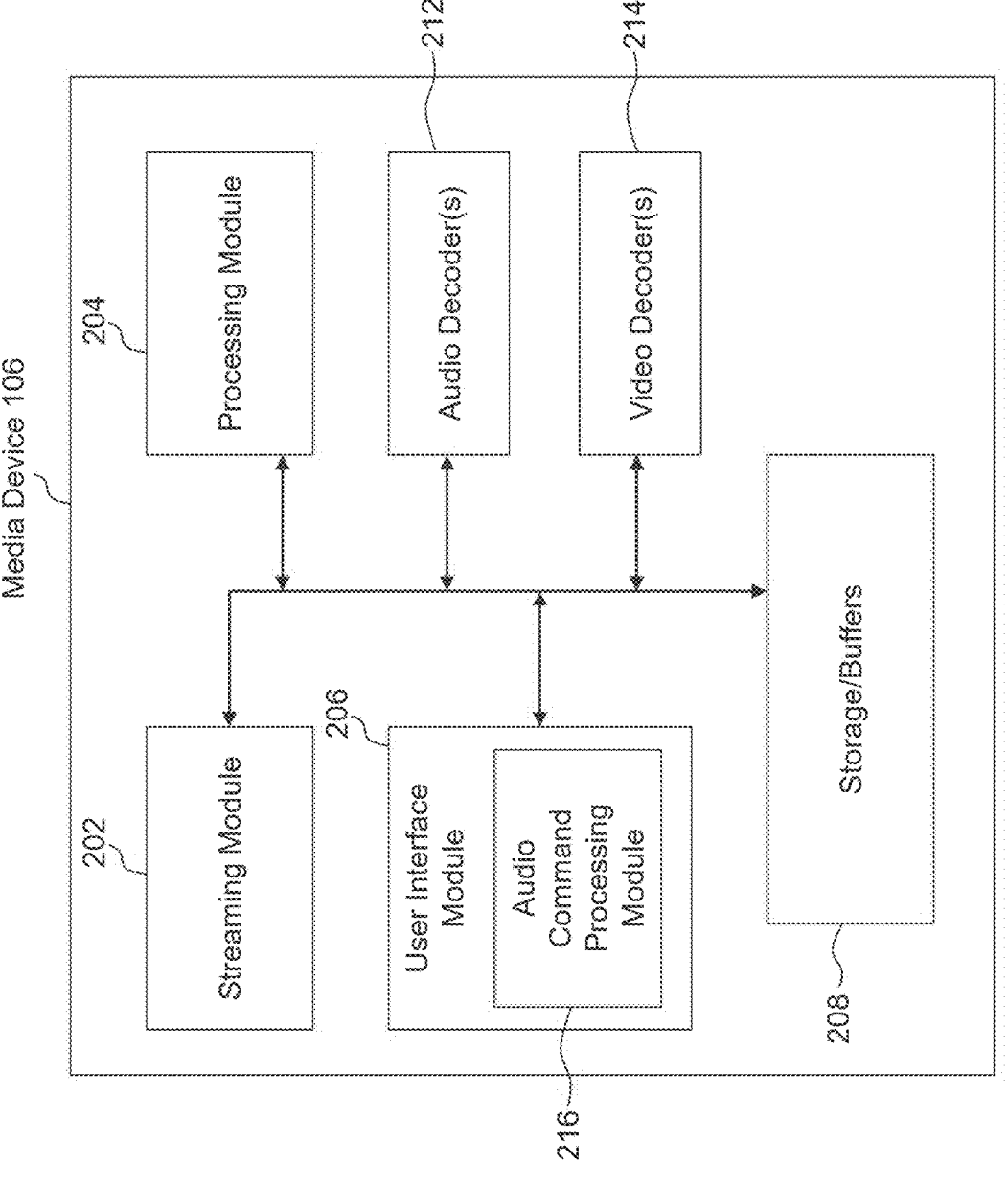
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206.

As described above, the user interface module 206 may include the audio command processing module 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Figure 3:
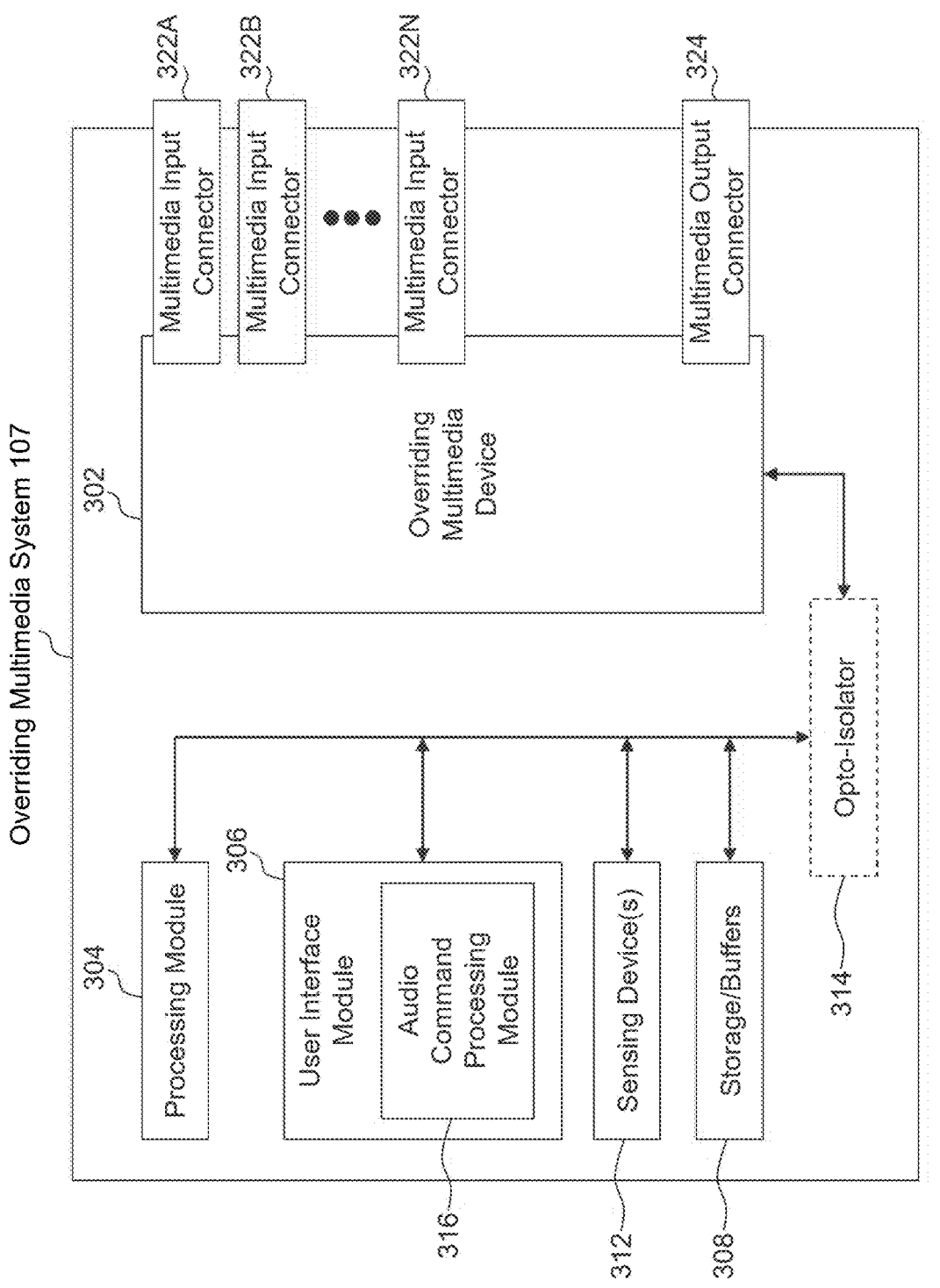
FIG. 3 is a block diagram of an overriding multimedia system, according to some embodiments.

FIG. 3 illustrates a block diagram of an example overriding multimedia system 107, according to some embodiments. In at least one embodiment, the overriding multimedia system 107 can be an enhancing multimedia system. In some embodiments, the overriding multimedia system 107 may be configured to perform a hardware override to control its inputs and output, bypassing the via electronic protocol (e.g., HDMI CEC protocol) to display high priority information, such as incoming videoconference calls, SMS text messages, calendar and event reminders, medication alerts, and emergency alerts. For example, the overriding multimedia system 107 can select a priority media signal by taking director control of the final electronic signal (e.g., HDMI signal) to the display device 108. In another example, the overriding multimedia system 107 may be configured to bypass or overlay any other sources dynamically.

Overriding multimedia system 107 may include an overriding multimedia device 302, processing module 304, storage/buffers 308, user interface module 306, and one or more sensing devices 312 (e.g., including, but not limited to, a microphone and a camera). In some embodiments, the user interface module 306 may include the audio command processing module 316 and may be coupled to the one or more sensing devices 312.

In some embodiments, the one or more sensing devices 312 may include an audio sensing device (e.g., a microphone) configured to receive audio data from users 132 (as well as other sources, such as the display device 108). In some embodiments, the overriding multimedia system 107 may be audio responsive, and the audio data may represent verbal commands from the user 132 to control the overriding multimedia system 107 as well as other components in the media system 104, such as the display device 108.

In some embodiments, the one or more sensing devices 312 may include a video sensing device (e.g., a high-definition (HD) camera) configured to capture video data from users 132 (as well as other sources, such as the display device 108). For example, the overriding multimedia system 107 may be configured to provide for video calling using a ten-foot user interface, an HD camera, and a smart zooming function to provide the user 132 with an improved video-conferencing experience.

In some embodiments, the audio data received by the microphone 112 in the remote control 110, or by the one or more sensing devices 312 in the overriding multimedia system 107, may be transferred to the overriding multimedia system 107, which is then forwarded to the audio command processing module 316 in the overriding multimedia system 107 for processing and analysis. The audio command processing module 316 may operate to process and analyze the received audio data to recognize the user 132's verbal command. The audio command processing module 316 may then forward the verbal command to another component of the overriding multimedia system 107 for processing.

Overriding multimedia system 107 may include one or more inputs and one or more outputs coupled to the overriding multimedia device 302. For example, overriding multimedia device 302 may include a plurality of multimedia input connectors 322A-322N connected to the overriding multimedia device 302 and a plurality of respective media devices 106. Overriding multimedia system 107 may further include a multimedia output connector 324 connected to the overriding multimedia device 302 and a display device 108.

In some embodiments, the processing module 304 may be connected to the overriding multimedia device 302 directly or, optionally, via an opto-isolator 314. For example, the processing module 304 may generate a control signal and transmit the control signal to the opto-isolator 314 via a GPIO interface. Opto-isolator 314 may receive the control signal. In some embodiments, a control signal can be transmitted based on the received control signal, and transmit the control signal to the overriding multimedia device 302 via a switch interface. In one illustrative example, the control signal may be configured to instruct the overriding multimedia device 302 to perform a switching function that is substantially similar to the switching function that would have been performed had the user 132 actuated a physical switch (e.g., pressed a physical button) connected to the overriding multimedia device 302 to override the multimedia inputs.

Figure 4:
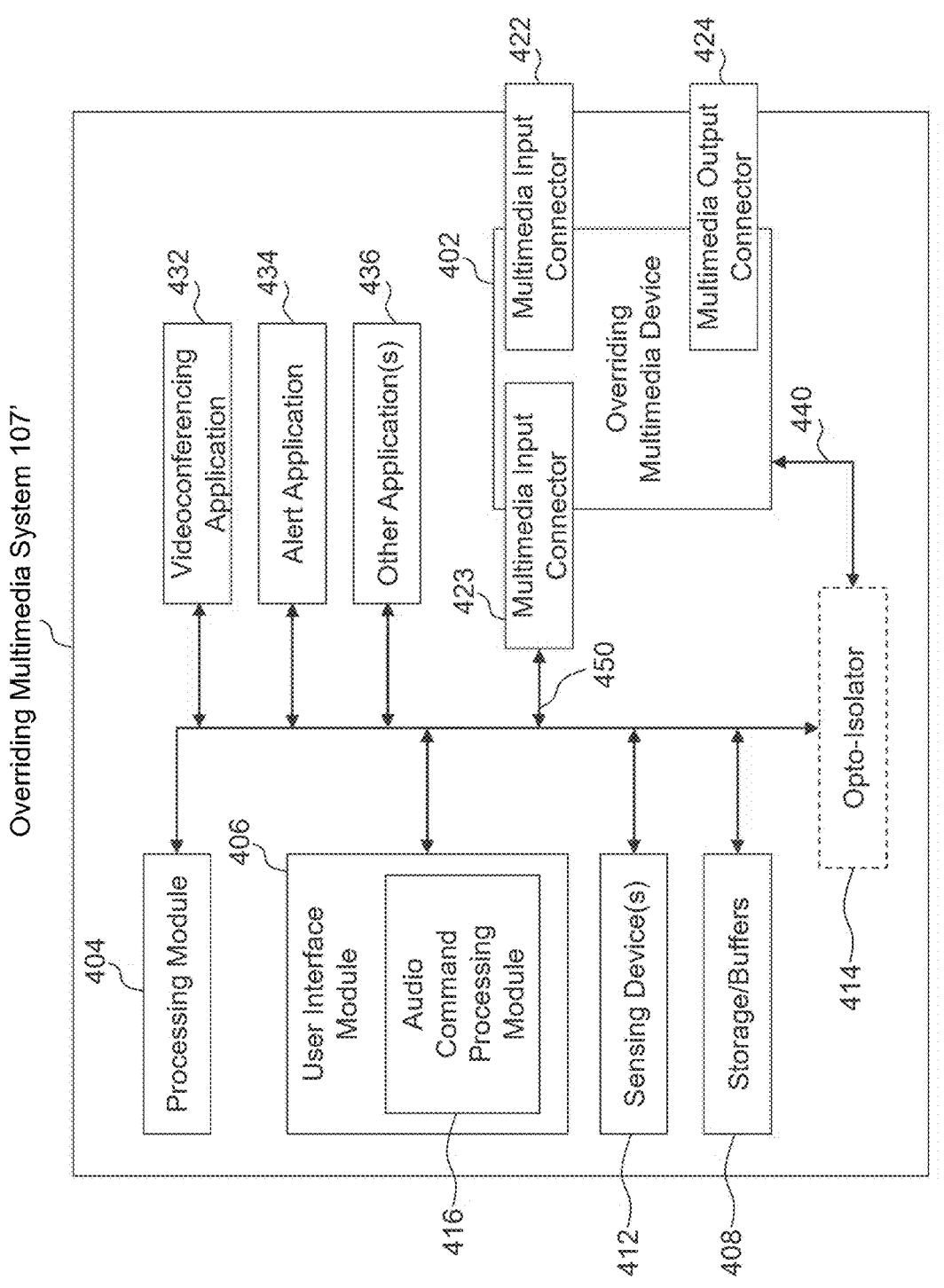
FIG. 4 is a block diagram of another overriding multimedia system, according to some embodiments.

FIG. 4 illustrates a block diagram of an example overriding multimedia system 107', according to some embodiments. In some embodiments, overriding multimedia system 107' may be configured to perform a hardware override to control its inputs and output via the physical electrical connection to display high priority information, such as incoming videoconference calls, SMS text messages, calendar and event reminders, and emergency alerts. For example, by selecting a priority media device and placing the selected media device in direct control of the final HDMI signal to the display device 108, overriding multimedia system 107' may be configured to bypass or overlay any other sources dynamically. In some embodiments, override multimedia system 107' may be configured to perform a media data modification operation to display high priority information via a visual overlay, audio overlay, and/or other data stream overlay (e.g., subtitles), such as incoming videoconference calls, SMS text messages, calendar and event reminders, and emergency alerts. An overlay can include a partial replacement of content, integration of alternative content, and/or system UI.

Overriding multimedia system 107' may include an overriding multimedia device 402, processing module 404, storage/buffers 408, user interface module 406, and one or more sensing devices 412 (e.g., including, but not limited to, a microphone and a camera). In some embodiments, the user interface module 406 may include the audio command processing module 416 and may be coupled to the one or more sensing devices 412.

Overriding multimedia system 107' may further include a videoconferencing application 432, an alert application 434, and one or more other applications 436 (e.g., a streaming media application, a photo album sharing application; a medication reminder, tracking, and ordering application; a wellness monitoring application; a home security application; a network monitoring application; a remote device control application; etc.).

The one or more sensing devices 412 may include an audio sensing device (e.g., a microphone) configured to receive audio data from users 132 (as well as other sources, such as the display device 108). In some embodiments, the overriding multimedia system 107' may be audio responsive, and the audio data may represent verbal commands from the user 132 to control the overriding multimedia system 107' as well as other components in the media system 104, such as the display device 108.

In some embodiments, the one or more sensing devices 412 may include a video sensing device (e.g., a high-definition (HD) camera) configured to capture video data from users 132 (as well as other sources, such as the display device 108). For example, the overriding multimedia system 107' may be configured to provide for video calling using a ten-foot user interface, an HD camera, and a smart zooming function to provide the user 132 with an improved video-conferencing experience.

In some embodiments, the audio data received by the microphone 112 in the remote control 110, or by the one or more sensing devices 412 in the overriding multimedia system 107', may be transferred to the overriding multimedia system 107', which is then forwarded to the audio command processing module 416 in the overriding multimedia system 107' for processing and analysis. The audio command processing module 416 may operate to process and analyze the received audio data to recognize the user 132's verbal command. The audio command processing module 416 may then forward the verbal command to another component of the overriding multimedia system 107' for processing.

Overriding multimedia system 107' may include one or more inputs and one or more outputs coupled to the overriding multimedia device 402. For example, overriding multimedia device 402 may include one or more of multimedia input connectors connected to the overriding multimedia device 402 and one or more respective media devices 106. The one or more of multimedia input connectors may include, but are not limited to, a first multimedia input connector 422 configured to connect (e.g., via a first HDMI cable) to a media device 106 or one or more applications. The one or more of multimedia input connectors may further include, but are not limited to, a second multimedia input connector 423 configured to connect (e.g., via a second HDMI cable) to the videoconferencing application 432, the alert application 434, and the one or more other applications 436. In some embodiments, the second multimedia input connector 423 may include one or more multimedia input connectors, such as: one multimedia input connector connected to one of the videoconferencing application 432, the alert application 434, and the one or more other applications 436; and another multimedia input connector connected to another of the videoconferencing application 432, the alert application 434, and the one or more other applications 436. Overriding multimedia system 107' may further include a multimedia output connector 424 connected to the overriding multimedia device 402 and a display device 108.

In some embodiments, the processing module 404 may be connected to the overriding multimedia device 402 directly or, optionally, via an opto-isolator 414. For example, the processing module 404 may generate a control signal and transmit the control signal to the opto-isolator 414 via a GPIO interface. Opto-isolator 414 may receive the control signal. In some embodiments, a control signal can be transmitted based on the received control signal, and transmit the control signal to the overriding multimedia device 402 via a switch interface. In one illustrative example, the control signal may be configured to instruct the overriding multimedia device 402 to perform a switching function that is substantially similar to the switching function that would have been performed had the user 132 actuated a physical switch (e.g., pressed a physical button) connected to the overriding multimedia device 402 to override the multimedia inputs.

Now referring to FIGS. 1, 2, 3, and 4, in some embodiments, the user 132 may interact with the media device 106, the overriding multimedia system 107, the overriding multimedia system 107', or a combination thereof via, for example, the remote control 110. In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

In one example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 via the overriding multimedia system 107 or 107' for playback to the user 132.

In another example, the user 132 may use the remote control 110 to interact with the user interface module 306 of the overriding multimedia system 107 or the overriding multimedia system 107' to select the outputs of one or more media devices 106 to view on the display device 108, such as when an incoming videoconference call is received by a second media device (e.g., a videoconferencing device) or a videoconferencing application 432, respectively, when the user 132 is watching a TV show on a first media device. The processing module 304 of the overriding multimedia system 107, or the processing module 404 of the overriding multimedia system 107', may identify the request as a request to perform a multimedia switching function, generate a control signal to instruct the overriding multimedia device 302 or the overriding multimedia device 402 to switch its input from the first media device to the second media device or the videoconferencing application 432, respectively, or a combination thereof (e.g., to be displayed by the display device 108 as a display screen overlay, a split screen, a mosaic, etc.). The processing module 304 or the processing module 404 may transmit the control signal to the overriding multimedia device 302 directly or via the opto-isolator 314. In response, the overriding multimedia device 302 or the overriding multimedia device 402 may switch its input from the first media device to the second media device or the videoconferencing application 432, respectively, or a combination thereof and transmit the corresponding multimedia signal to the display device 108 for playback to the user 132.

Overriding Multimedia Systems

Referring to FIG. 1, several media devices 106 may exist in each media system 104. Accordingly, the media devices 106 may lend themselves to multimedia switching embodiments. In some embodiments, the overriding multimedia system 107 can operate to switch the audio and visual content presented to the user 132 by the display device 108 from a first media device to a second media device or a combination of the first and second media devices, such as when the user 132 receives a videoconference call while watching a TV show.

In some embodiments, as shown in FIG. 3, overriding multimedia system 107 may include a first multimedia input connector 322A configured to connect to a first media device (e.g., a set-top box coupled to one or more content servers 120) and receive a first multimedia signal (e.g., content 122, metadata 124, or both) from the first media device. In some embodiments, overriding multimedia system 107 may include a second multimedia input connector 322B configured to connect to a second media device (e.g., a videoconferencing device such as a smartphone) and receive a second multimedia signal (e.g, a videoconferencing signal, an alert signal) from the second media device. In some embodiments, overriding multimedia system 107 may include a multimedia output connector 324 configured to connect to a display device 108 and transmit the first multimedia signal, the second multimedia signal, or a combination of the first multimedia signal and the second multimedia signal to the display device 108.

In some embodiments, overriding multimedia system 107 may further include an overriding multimedia device 302 that is electrically coupled to the first multimedia input connector 322A, the second multimedia input connector 322B, and the multimedia output connector 324. In some embodiments, the overriding multimedia device 302 may be configured to generate, at a first time, a first conductive electrical path between the first multimedia input connector 322A and the multimedia output connector 324. In some embodiments, the overriding multimedia device 302 may be configured to receive (e.g., from processing module 304) a multimedia switching actuation signal (e.g., an HDMI CEC control signal) and, in response to a receipt of the multimedia switching actuation signal, generate, at a second time later than the first time, a second conductive electrical path between the second multimedia input connector 322B and the multimedia output connector 324 to permit the second media device to assume control (e.g., HDMI CEC control) over the output of the overriding multimedia system 107. In some aspects, the multimedia switching actuation signal may be configured to instruct the overriding multimedia device 302 to perform a switching function as though the user 132 had pressed a physical button connected to the overriding multimedia device 302 to override the multimedia inputs.

In some embodiments, the first multimedia input connector 322A may be a first HDMI input connector. In some embodiments, the second multimedia input connector 322B may be a second HDMI input connector. In some embodiments, the multimedia output connector 324 may be an HDMI output connector. In some embodiments, the overriding multimedia device 302 may be an HDMI switching device (e.g., an HDMI switch). In some embodiments, the multimedia switching actuation signal may be an HDMI switching actuation signal.

In some embodiments, overriding multimedia system 107 may further include one or more sensing devices 312 configured to detect sensor data (e.g., sensor data relating to, or potentially relating to, a multimedia switching event). In some embodiments, the one or more sensing devices 312 may include an audio sensing device, and the sensor data may include an audio signal. In at least one embodiment, sensor data can include audio data, video data, input data (e.g., user input via remote control, motion data, emergency alert data, phone call), and/or environmental data (e.g., proximity detection, fire detector, assistant device data such as an alarm or timer). In some embodiments, the audio signal may include a voice command including a wake command (e.g., "Roku," "Hey," etc.) and an action command (e.g., "Call my dad," "Answer call," "Pick up the phone," etc.) indicative of a request by the user 132 for overriding multimedia system 107 to perform an action.

In some embodiments, overriding multimedia system 107 may further include storage/buffers 308 (e.g., a memory) configured to store priority multimedia input data that includes: a first priority value for the first multimedia signal, the first media device, or a combination thereof; and a second priority value for the second multimedia signal, the second media device, or a combination thereof. In some embodiments, the processing module 304 may be configured to instruct the overriding multimedia device 302 to select, as the input for multimedia output connector 324, the media device having the highest priority value. For example, the second priority value for the second media device may be configured to be less than the first priority value for the first media device unless the second media device is receiving, making, playing, or displaying a video, audio, or multimedia call or alert. In one illustrative example, at an initial time (e.g., such as when the user 132 is watching a TV show via the first media device), the first priority value for the first media device may be about equal to 0.5 and the second priority value for the second media device may be about equal to 0.0. Then, at a later time (e.g., such as when the user 132 makes or receives a videoconference call, or receives an alert, via the second media device), the first priority value for the first media device may remain at about 0.5 and the processing module 304 may increase the second priority value for the second media device to about 1.0. Finally, at an even later time (e.g., such as when the videoconference call or alert is complete), the first priority value for the first media device may remain at about 0.5 and the processing module 304 may decrease the second priority value for the second media device back to about 0.0.

In some embodiments, overriding multimedia system 107 may further include processing module 304 (e.g., at least one processor) coupled to the storage/buffers 308 and configured to determine, based on the priority multimedia input data stored in the storage/buffers 308, whether the sensor data detected by the one or more sensing devices 312 corresponds to a multimedia switching action. In one illustrative example, the sensor data may correspond to the multimedia switching action if the sensor data causes the first priority value and the second priority value to switch their priority ranking (e.g., if the sensor data causes the second priority value to increase above the first priority value, such as when initiating a videoconference call or alert; or if the sensor data causes the second priority value to decrease below the first priority value, such as when terminating the videoconference call or alert).

In response to a determination that the sensor data corresponds to the multimedia switching action, the processing module 304 is further configured to generate, at a third time between the first time and the second time, the multimedia switching actuation signal. The multimedia switching actuation signal is configured to instruct the overriding multimedia device 302 to switch an output of the multimedia output connector 324 from the first multimedia signal to the second multimedia signal. In some embodiments, the second multimedia signal may include a combination of the first multimedia signal and a third multimedia signal. The processing module 304 is further configured to transmit the multimedia switching actuation signal to the overriding multimedia device 302 (e.g., via the opto-isolator 314).

In some embodiments, the first media device connected to the first multimedia input connector 322A may be a set-top box coupled (e.g., via network 118) to one or more content servers 120, and the first multimedia signal may include content 122 and metadata 124 received from the one or more content servers 120. In some embodiments, the second media device connected to the second multimedia input connector 322B may be a videoconferencing device, and the second multimedia signal may be a videoconferencing signal (e.g., indicative of an incoming videoconference call). In some embodiments, the processing module 304 may be further configured to determine, based on the priority multimedia input data (e.g., in response to the sensor data representing a ringing sound corresponding to a maximum priority value), that the sensor data corresponds to a videoconferencing initiation action. In some embodiments, the multimedia switching action may be, or include, the videoconferencing initiation action.

In some embodiments, the multimedia switching actuation signal may be configured to instruct the overriding multimedia device 302 to switch the output of the multimedia output connector 324 from the first multimedia signal to the second multimedia signal. In such embodiments, in response to the receipt of the multimedia switching actuation signal, the overriding multimedia device 302 may be further configured to terminate a display of the first multimedia signal. For example, in response to the receipt of the multimedia switching actuation signal, the overriding multimedia device 302 may be configured to terminate, at or before the second time, the first conductive electrical path between the first multimedia input connector 322A and the multimedia output connector 324.

In some embodiments, the multimedia switching actuation signal may be configured to instruct the overriding multimedia device 302 to switch the output of the multimedia output connector 324 from the first multimedia signal to a combination of the first multimedia signal and the second multimedia signal. In such embodiments, the combination of the first multimedia signal and the second multimedia signal may include a multimedia overlay signal comprising the second multimedia signal overlaid over the first multimedia signal.

In some embodiments, the one or more sensing devices 312 may include an audio sensing device, and the sensor data may include an audio signal. In some embodiments, the audio signal may include a voice command including a wake command (e.g., "Roku," "Hey," etc.) and an action command (e.g., "Call my dad," "Answer call," "Pick up the phone," etc.). In some embodiments, the processing module 304 may be further configured to detect the wake command and, in response to a detection of the wake command, determine, based on the priority multimedia input data, that the action command corresponds to the multimedia switching action.

In some embodiments, the audio signal may include a ringing sound such as a telephone ring. In some embodiments, the processing module 304 may be further configured to detect the ringing sound and, in response to a determination that the ringing sound corresponds to a videoconferencing initiation action (and not, for example, a doorbell), determine, based on the priority multimedia input data, that the ringing sound corresponds to the multimedia switching action.

In some embodiments, the audio signal may include a beeping sound such as a smoke alarm or an emergency notification (e.g., a Wireless Emergency Alert (WEA) from the U.S. Emergency Alert System; an America's Missing: Broadcast Emergency Response (AMBER) Alert; a Silver Alert). In some embodiments, the processing module 304 may be further configured to detect the beeping sound and, in response to a determination that the beeping sound corresponds to an alert initiation action (and not, for example, a siren in a TV show), determine, based on the priority multimedia input data, that the beeping sound corresponds to the multimedia switching action.

In some embodiments, the processing module 304 may be further configured to classify the audio signal as a classified alert initiation action (e.g., to classify detected sounds or voice commands as alert initiation actions or videoconferencing initiation actions) using an audio signal classifier machine learning model trained by a process comprising: (i) generating a probability value that the audio signal corresponds to an alert initiation action; (ii) determining that the probability value satisfies an alert initiation action threshold value; and (iii) generating the classified alert initiation action based on the determining that the probability value satisfies an alert initiation action threshold value. In some embodiments, in response to a classification of the audio signal as the classified alert initiation action, the processing module 304 may be further configured to determine, based on the priority multimedia input data, that the classified alert initiation action corresponds to the multimedia switching action.

In some embodiments, the overriding multimedia system 107 may receive (e.g., from the second media device), an emergency signal (e.g., a WEA, AMBER, or Silver alert) and, in response, the processing module 304 may generate a multimedia switching actuation signal configured to instruct the overriding multimedia device 304 to switch its output to the second multimedia input connector 322B. If the display device 108 is turned off or in a sleep state, the processing module 304 may further instruct the display device 108 to turn on or wake up, respectively, display the video included in the emergency signal, and increase its volume to a maximum volume level and play the audio included in the emergency signal.

In some embodiments, as shown in FIG. 4, overriding multimedia system 107' may include a first multimedia input connector 422 configured to connect to a media device 106 (e.g., a set-top box coupled to one or more content servers 120) and receive a first multimedia signal (e.g., content 122, metadata 124, or both) from the media device 106. In some embodiments, overriding multimedia system 107' may include a second multimedia input connector 423 configured to connect to a videoconferencing application 432, an alert application 434, one or more other applications 436 (e.g., a photo album sharing application), or a combination thereof, via a multimedia communications path 450 (e.g., an HDMI cable), and receive a second multimedia signal (e.g, a videoconferencing signal, an alert signal) from the videoconferencing application 432, the alert application 434, or the one or more other applications 436. In some embodiments, overriding multimedia system 107' may include a multimedia output connector 424 configured to connect to a display device 108 and transmit the first multimedia signal, the second multimedia signal, or a combination of the first multimedia signal and the second multimedia signal to the display device 108.

In some embodiments, overriding multimedia system 107' may further include an overriding multimedia device 402 that is electrically coupled to the first multimedia input connector 422, the second multimedia input connector 423, and the multimedia output connector 424. In some embodiments, the overriding multimedia device 402 may be configured to generate, at a first time, a first conductive electrical path between the first multimedia input connector 422 and the multimedia output connector 424. In some embodiments, the overriding multimedia device 402 may be configured to receive (e.g., from processing module 404) a multimedia switching actuation signal (e.g., an HDMI CEC control signal) and, in response to a receipt of the multimedia switching actuation signal, generate, at a second time later than the first time, a second conductive electrical path between the second multimedia input connector 423 and the multimedia output connector 424 to permit the videoconferencing application 432, the alert application 434, or the one or more other applications 436 to assume control (e.g., HDMI CEC control) over the output of the overriding multimedia system 107'. In some aspects, the multimedia switching actuation signal may be configured to instruct the overriding multimedia device 402 to perform a switching function as though the user 132 had pressed a physical button connected to the overriding multimedia device 402 to override the multimedia inputs.

In some embodiments, the first multimedia input connector 422 may be a first HDMI input connector. In some embodiments, the second multimedia input connector 423 may be a second HDMI input connector. In some embodiments, the multimedia output connector 424 may be an HDMI output connector. In some embodiments, the overriding multimedia device 402 may be an HDMI switching device (e.g., an HDMI switch). In some embodiments, the multimedia switching actuation signal may be an HDMI switching actuation signal.

In some embodiments, overriding multimedia system 107' may further include one or more sensing devices 412 configured to detect sensor data. In some embodiments, the one or more sensing devices 412 may include an audio sensing device, and the sensor data may include an audio signal. In some embodiments, the audio signal may include a voice command including a wake command and an action command indicative of a request by the user 132 for overriding multimedia system 107' to perform an action.

In some embodiments, overriding multimedia system 107' may further include storage/buffers 408 (e.g., a memory) configured to store priority multimedia input data that includes a first priority value for the media device 106 and a set of priority values for the videoconferencing application 432, the alert application 434, the one or more other applications 436, or a combination thereof.

In some embodiments, the processing module 404 may be configured to instruct the overriding multimedia device 402 to select, as the input for multimedia output connector 424, the media device or application having the highest priority value. For example, the second priority value for the videoconferencing application 432, the alert application 434, or the one or more other applications 436 may be configured to be less than the first priority value for the media device 106 unless the videoconferencing application 432, the alert application 434, or the one or more other applications 436 is receiving, making, playing, or displaying a video, audio, or multimedia call or alert.

In one illustrative example, at an initial time (e.g., such as when the user 132 is watching a TV show via the media device 106), the first priority value for the media device 106 may be about equal to 0.5 and the second priority value for the videoconferencing application 432 may be about equal to 0.0. Then, at a later time (e.g., such as when the user 132 makes or receives a videoconference call via the videoconferencing application 432), the first priority value for the media device 106 may remain at about 0.5 and the processing module 404 may increase the second priority value for the videoconferencing application 432 to about 1.0. Finally, at an even later time (e.g., such as when the videoconference call or alert is complete), the first priority value for the media device 106 may remain at about 0.5 and the processing module 404 may decrease the second priority value for the videoconferencing application 432 back to about 0.0.

In another illustrative example, at an initial time (e.g., such as when the user 132 is watching a TV show via the media device 106), the first priority value for the media device 106 may be about equal to 0.5 and the second priority value for the alert application 434 may be about equal to 0.0. Then, at a later time (e.g., such as when the alert application 434 receives an non-emergency alert (e.g., an SMS text message, a calendar reminder, an event reminder, a medication reminder, a medication refill tracking notification, a medication ordering UI) or an emergency alert (e.g., a severe weather warning) via the alert application 434), the first priority value for the media device 106 may remain at about 0.5 and the processing module 404 may increase the second priority value for the alert application 434 to about 1.0. Finally, at an even later time (e.g., such as when the alert is complete or after a timeout value has been reached), the first priority value for the media device 106 may remain at about 0.5 and the processing module 404 may decrease the second priority value for the alert application 434 back to about 0.0.

In yet another illustrative example, at an initial time (e.g., such as when the user 132 is watching a TV show via the media device 106), the first priority value for the media device 106 may be about equal to 0.5, the second priority value for the videoconferencing application 432 may be about equal to 0.1, and a third priority value for the alert application 434 may be equal to about 0.0. Then, at a later time (e.g., such as when the user 132 makes or receives a videoconference call via the videoconferencing application 432), the first priority value for the media device 106 may remain at about 0.5, the third priority value for the alert application 434 may remain at about 0.0, and the processing module 404 may increase the second priority value for the videoconferencing application 432 to about 0.8. Then, at an even later time (e.g., such as when the alert application 434 receives an emergency alert via the alert application 434), the first priority value for the media device 106 may remain at about 0.5, the second priority value for the videoconferencing application 432 may remain at about 0.8, and the processing module 404 may increase the third priority value for the alert application 434 to about 1.0. Subsequently, at an even later time (e.g., such as when the alert is complete or after a timeout value has been reached), the first priority value for the media device 106 may remain at about 0.5, the second priority value for the videoconferencing application 432 may remain at about 0.8, and the processing module 404 may decrease the third priority value for the alert application 434 back to about 0.0. Finally, at a still later time (e.g., such as when the videoconference call is complete), the first priority value for the media device 106 may remain at about 0.5, the third priority value for the alert application 434 may remain at about 0.0, and the processing module 404 may decrease the second priority value for the videoconferencing application 432 back to about 0.1.

In some embodiments, overriding multimedia system 107' may further include processing module 404 (e.g., at least one processor) coupled to the storage/buffers 408 and configured to determine, based on the priority multimedia input data stored in the storage/buffers 408, whether the sensor data detected by the one or more sensing devices 412 corresponds to a multimedia switching action. In one illustrative example, the sensor data may correspond to the multimedia switching action if the sensor data causes the first priority value and the second priority value to switch their priority ranking (e.g., if the sensor data causes the second priority value to increase above the first priority value, such as when initiating a videoconference call or alert; or if the sensor data causes the second priority value to decrease below the first priority value, such as when terminating the videoconference call or alert).

In response to a determination that the sensor data corresponds to the multimedia switching action, the processing module 404 is further configured to generate, at a third time between the first time and the second time, the multimedia switching actuation signal. The multimedia switching actuation signal is configured to instruct the overriding multimedia device 402 to switch an output of the multimedia output connector 424 from the first multimedia signal to the second multimedia signal. In some embodiments, the second multimedia signal may include a combination of the first multimedia signal and a third multimedia signal. The processing module 404 is further configured to transmit the multimedia switching actuation signal to the overriding multimedia device 402 via a control communications path 440 connected to an override interface of the overriding multimedia device 402 (and, optionally, via the opto-isolator 414).

In some embodiments, the media device 106 connected to the first multimedia input connector 422 may be a set-top box coupled (e.g., via network 118) to one or more content servers 120, and the first multimedia signal may include content 122 and metadata 124 received from the one or more content servers 120. In some embodiments, the application connected to the second multimedia input connector 423 may be a videoconferencing application 432, and the second multimedia signal may be a videoconferencing signal (e.g., indicative of an incoming videoconference call). In some embodiments, the processing module 404 may be further configured to determine, based on the priority multimedia input data, that the sensor data corresponds to a videoconferencing initiation action. In some embodiments, the multimedia switching action may be, or include, the videoconferencing initiation action.

In some embodiments, the multimedia switching actuation signal may be configured to instruct the overriding multimedia device 402 to switch the output of the multimedia output connector 424 from the first multimedia signal to the second multimedia signal. In such embodiments, in response to the receipt of the multimedia switching actuation signal, the overriding multimedia device 402 may be further configured to terminate, at or before the second time, a display of the first multimedia signal (e.g., by terminating the first conductive electrical path between the first multimedia input connector 422 and the multimedia output connector 424).

In some embodiments, the multimedia switching actuation signal may be configured to instruct the overriding multimedia device 402 to switch the output of the multimedia output connector 424 from the first multimedia signal to a combination of the first multimedia signal and the second multimedia signal. In such embodiments, the combination of the first multimedia signal and the second multimedia signal may include a multimedia overlay signal comprising the second multimedia signal overlaid over the first multimedia signal.

In some embodiments, the one or more sensing devices 412 may include an audio sensing device, and the sensor data may include an audio signal. In some embodiments, the audio signal may include a voice command including a wake command (e.g., "Roku," "Hey," etc.) and an action command (e.g., "Call my dad," "Answer call," "Pick up the phone," etc.). In some embodiments, the processing module 404 may be further configured to detect the wake command and, in response to a detection of the wake command, determine, based on the priority multimedia input data, that the action command corresponds to the multimedia switching action.

In some embodiments, the audio signal may include a ringing sound such as a telephone ring. In some embodiments, the processing module 404 may be further configured to detect the ringing sound and, in response to a determination that the ringing sound corresponds to a videoconferencing initiation action (and not, for example, a doorbell), determine, based on the priority multimedia input data, that the ringing sound corresponds to the multimedia switching action.

In some embodiments, the audio signal may include a beeping sound such as a smoke alarm or an emergency notification (e.g., a WEA, AMBER, or Silver alert). In some embodiments, the processing module 404 may be further configured to detect the beeping sound and, in response to a determination that the beeping sound corresponds to an alert initiation action (and not, for example, a siren in a TV show), determine, based on the priority multimedia input data, that the beeping sound corresponds to the multimedia switching action.

In some embodiments, the processing module 404 may be further configured to classify the audio signal as a classified alert initiation action (e.g., to classify detected sounds or voice commands as alert initiation actions or videoconferencing initiation actions) using an audio signal classifier machine learning model trained by a process comprising: (i) generating a probability value that the audio signal corresponds to an alert initiation action; (ii) determining that the probability value satisfies an alert initiation action threshold value; and (iii) generating the classified alert initiation action based on the determining that the probability value satisfies an alert initiation action threshold value. In some embodiments, in response to a classification of the audio signal as the classified alert initiation action, the processing module 404 may be further configured to determine, based on the priority multimedia input data, that the classified alert initiation action corresponds to the multimedia switching action.

In some embodiments, the overriding multimedia system 107' may receive (e.g., from the alert application 434; from an If This Then That (IFTTT) application included in the one or more other applications 436), an emergency signal (e.g., a WEA, AMBER, or Silver alert) and, in response, the processing module 304 may generate a multimedia switching actuation signal configured to instruct the overriding multimedia device 404 to switch its output to the second multimedia input connector 423. If the display device 108 is turned off or in a sleep state, the processing module 404 may further instruct the display device 108 to turn on or wake up, respectively, display the video included in the emergency signal, and increase its volume to a maximum volume level and play the audio included in the emergency signal.

In one illustrative and non-limiting example, the user 132 may speak the voice command "Hey, call my dad" while playing a video game on a video game console connected to the user 132's respective display device 108 through a respective overriding multimedia system 107'. In response, the overriding multimedia system 107' may perform a hardware switch of the HDMI channel connected to the respective multimedia output connector 424 from the video game console to videoconferencing application 432. Thereby, the respective videoconferencing application 432 may gain hardware control of the HDMI CEC functionality of the respective overriding multimedia system 107'. When the call is over, the respective videoconferencing application 432 relinquishes hardware control back to the video game console.

Similarly, the user 132's father may receive an incoming videoconference call from the user 132 while watching a movie on a streaming device connected to the user 132's father's respective display device 108 through a respective overriding multimedia system 107', and an incoming call notification "Richard, your son is calling!" may be played, displayed, or both on the display device 108. The user 132's father may speak the voice command "Hello!" and, in response, the overriding multimedia system 107' may perform a hardware switch of the HDMI channel connected to the respective multimedia output connector 424 from the streaming device to videoconferencing application 432. Thereby, the respective videoconferencing application 432 may gain hardware control of the HDMI CEC functionality of the respective overriding multimedia system 107'. When the call is over, the respective videoconferencing application 432 relinquishes hardware control back to the streaming device.

FIG. 5 is a flowchart for a method 500 for multimedia switching, according to an embodiment. Method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1 and 3 (and, in some embodiments, with reference to FIG. 4). However, method 500 is not limited to those example embodiments.

In 502, processing module 304 receives sensor data detected by one or more sensing devices 312 and relating to a multimedia switching event, such as an incoming videoconference call or alert.

In 504, processing module 304 determines (e.g., based on priority multimedia input data stored in storage/buffers 308) that the sensor data corresponds to a multimedia switching action by determining that the sensor data has caused a first priority value for a first multimedia signal to decrease below a second priority value for a second multimedia signal. In one example, the first multimedia signal may be received by the overriding multimedia device 302 from a first media device 106 connected to the first multimedia input connector 322A of the overriding multimedia device 302, and the second multimedia signal may be received by the overriding multimedia device 302 from a second media device 106 connected to the second multimedia input connector 322B of the overriding multimedia device 302. In another example, the first multimedia signal may be received by the overriding multimedia device 402 from a media device 106 connected to the first multimedia input connector 422 of the overriding multimedia device 402, and the second multimedia signal may be received by the overriding multimedia device 402 from an application (e.g., the videoconferencing application 432, the alert application 434, or the one or more other applications 436) connected to the second multimedia input connector 423 of the overriding multimedia device 402. In yet another example, the first multimedia signal may be received by the overriding multimedia device 402 from a first application (e.g., one of the videoconferencing application 432, the alert application 434, and the one or more other applications 436), and the second multimedia signal may be received by the overriding multimedia device 402 from a second application (e.g., another of the videoconferencing application 432, the alert application 434, and the one or more other applications 436).

In 506, in response to determining that the sensor data corresponds to the multimedia switching action, processing module 304 generates a multimedia switching actuation signal that instructs an overriding multimedia device 302 to switch an output of the overriding multimedia device 302 (e.g., to a display device 108 connected to multimedia output connector 324) from the first multimedia signal to the second multimedia signal. In some embodiments, the second multimedia signal may include any composition of signals, such as a combination of the first multimedia signal and a third multimedia signal (e.g., to be displayed by the display device 108 as a display screen overlay, a split screen, a mosaic, etc.).

In 508, processing module 304 transmits the multimedia switching actuation signal to the overriding multimedia device 302 to perform the multimedia switching.

Example Computer System

Figure 6:
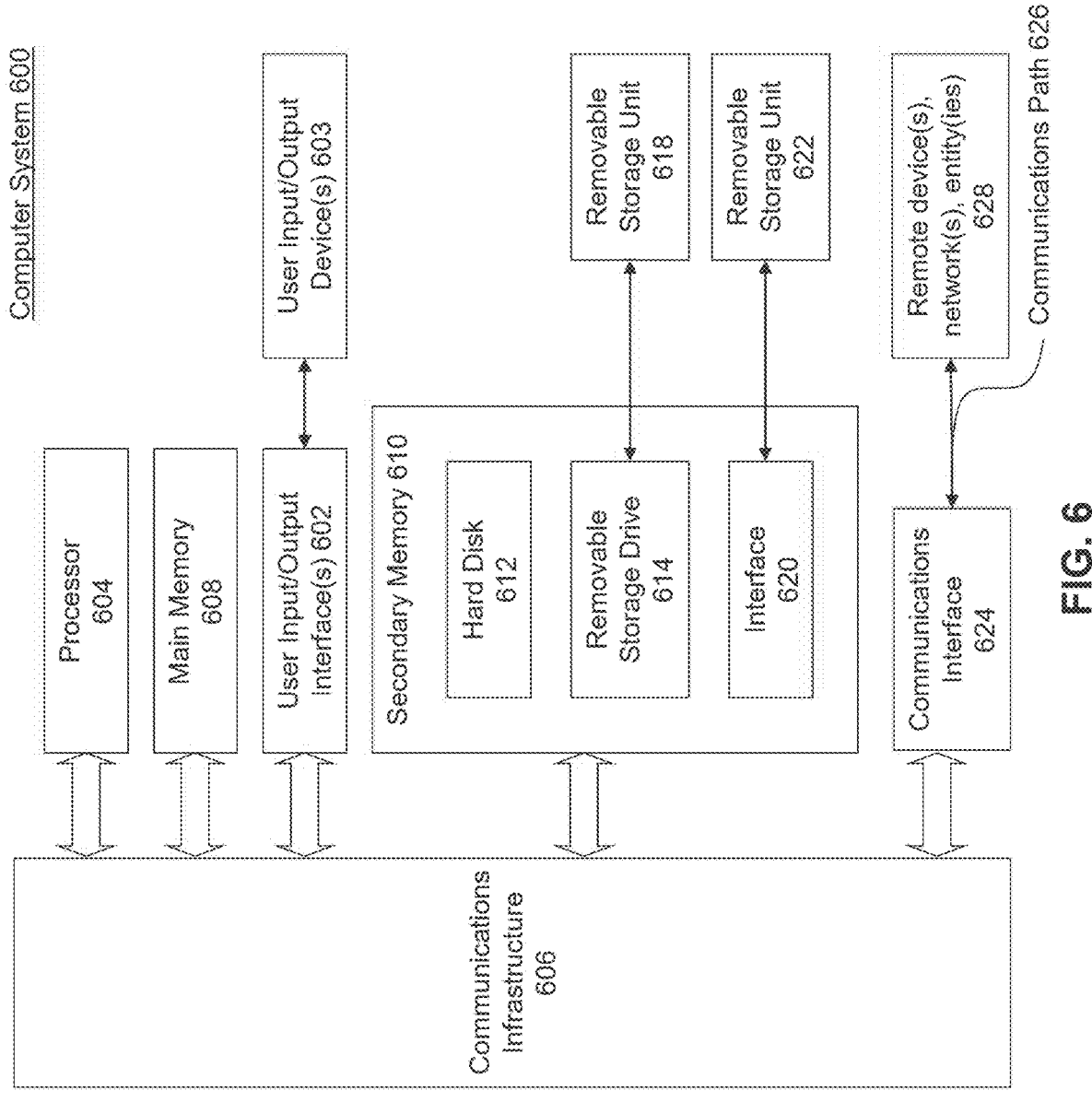
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as one or more processors 604. In some embodiments, one or more processors 604 may be connected to a communications infrastructure 606 (e.g., a bus).

Computer system 600 may also include user input/output device(s) 603, such as monitors, keyboards, pointing devices, etc., which may communicate with communications infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main memory 608 (e.g., a primary memory or storage device), such as random access memory (RAM). Main memory 608 may include one or more levels of cache. Main memory 608 may have stored therein control logic (i.e., computer software) and/or data.

Computer system 600 may also include one or more secondary storage devices or memories such as secondary memory 610. Secondary memory 610 may include, for example, a hard disk drive 612, a removable storage drive 614 (e.g., a removable storage device), or both. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (e.g., control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communications interface 624 (e.g., a network interface). Communications interface 624 may enable computer system 600 to communicate and interact with any combination of external devices, external networks, external entities, etc. (individually and collectively referenced by reference number 628). For example, communications interface 624 may allow computer system 600 to communicate with external devices 628 (e.g., remote devices) over communications path 626, which may be wired and/or wireless (or a combination thereof), and which may include any combination of LANs, WANs, the Internet, etc. Control logic and/or data may be transmitted to and from computer system 600 via communications path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 600, main memory 608, secondary memory 610, removable storage unit 618, and removable storage unit 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A system, comprising:
one or more memories configured to store priority multimedia input data comprising a first priority value for a first multimedia signal and a second priority value for a second multimedia signal; and
at least one processor each coupled to at least one of the memories and configured to perform operations comprising:
determining that received data corresponds to a multimedia switching action based on a determination that the received data has caused the second priority value to increase above the first priority value;
generating a multimedia switching actuation signal configured to instruct an overriding multimedia device to switch an output of the overriding multimedia device from the first multimedia signal to the second multimedia signal; and
transmitting the multimedia switching actuation signal to the overriding multimedia device to display multimedia content received from an application.

2. The system of claim 1, wherein the multimedia content received from the application comprises any of: incoming videoconference calls, SMS text messages, calendar reminders, event reminders, medication alerts, or emergency alerts.

3. The system of claim 1, wherein the multimedia switching actuation signal is a High-Definition Multimedia Interface (HDMI) switching actuation signal.

4. The system of claim 1, wherein the multimedia switching actuation signal is a Consumer Electronics Control (CEC) switching actuation signal.

5. The system of claim 1, wherein the received data comprises any of: a user input via a remote control, an emergency alert data, a phone call, environmental data, a fire detector, an alarm, or a timer.

6. The system of claim 5, wherein the received data comprises a voice command comprising a wake command and an action command, and the at least one processor is further configured to:
detect the wake command; and
in response to a detection of the wake command, determine, based on the priority multimedia input data, that the action command corresponds to the multimedia switching action.

7. The system of claim 6, wherein the operations further comprise:
classifying the received data as a classified alert initiation action using an audio signal classifier machine learning model trained by a process comprising:
generating a probability value that an audio signal corresponds to an alert initiation action,
determining that the probability value satisfies an alert initiation action threshold value, and generating the classified alert initiation action based on the determining that the probability value satisfies the alert initiation action threshold value; and in response to classifying the audio signal as the classified alert initiation action, determining, based on the priority multimedia input data, that the classified alert initiation action corresponds to the multimedia switching action.

8. The system of claim 1, wherein the multimedia switching actuation signal is further configured to instruct the overriding multimedia device to terminate a display of the first multimedia signal.

9. A non-transitory computer-readable medium having instructions stored thereon that, when executed by at least one computing device, cause the at least one computing device to perform operations comprising:

storing priority multimedia input data comprising a first priority value for a first multimedia signal and a second priority value for a second multimedia signal;

determining that received data corresponds to a multimedia switching action based on a determination that the received data has caused the second priority value to increase above the first priority value;

generating a multimedia switching actuation signal configured to instruct an overriding multimedia device to switch an output of the overriding multimedia device from the first multimedia signal to the second multimedia signal; and transmitting the multimedia switching actuation signal to the overriding multimedia device to display multimedia content received from an application.

10. The non-transitory computer-readable medium of claim 9, wherein the multimedia content received from the application comprises any of: incoming videoconference calls, SMS text messages, calendar reminders, event reminders, medication alerts, or emergency alerts.

11. The non-transitory computer-readable medium of claim 9, wherein the multimedia switching actuation signal is a High-Definition Multimedia Interface (HDMI) switching actuation signal.

12. The non-transitory computer-readable medium of claim 9, wherein the received data comprises any of: a user input via remote control, emergency alert data, a phone call, environmental data, a fire detector, an alarm, or a timer.

13. The non-transitory computer-readable medium of claim 9, wherein the received data comprises a voice command comprising a wake command and an action command, and the operations further comprise:

detecting the wake command; and in response to the detecting the wake command, determining, based on the priority multimedia input data, that the action command corresponds to the multimedia switching action.

14. The non-transitory computer-readable medium of claim 9, wherein the received data comprises an audio signal, and the operations further comprise:

classifying the audio signal as a classified alert initiation action using an audio signal classifier machine learning model trained by a process comprising:

generating a probability value that the audio signal corresponds to an alert initiation action, determining that the probability value satisfies an alert initiation action threshold value, and generating the classified alert initiation action based on the determining that the probability value satisfies the alert initiation action threshold value; and in response to the classifying the audio signal as the classified alert initiation action, determining, based on the priority multimedia input data, that the classified alert initiation action corresponds to the multimedia switching action.

15. A computer-implemented method, comprising:

storing, by at least one processor, priority multimedia input data comprising a first priority value for a first multimedia signal and a second priority value for a second multimedia signal;

determining that received data corresponds to a multimedia switching action based on a determination that the received data has caused the second priority value to increase above the first priority value;

generating a multimedia switching actuation signal configured to instruct an overriding multimedia device to switch an output of the overriding multimedia device from the first multimedia signal to the second multimedia signal; and transmitting the multimedia switching actuation signal to the overriding multimedia device to display multimedia content received from an application.

16. The computer-implemented method of claim 15, wherein the multimedia content received from the application comprises any of: incoming videoconference calls, SMS text messages, calendar reminders, event reminders, medication alerts, or emergency alerts.

17. The computer-implemented method of claim 15, wherein the multimedia switching actuation signal is a High-Definition Multimedia Interface (HDMI) switching actuation signal.

18. The computer-implemented method of claim 15, wherein the received data comprises a voice command comprising a wake command and an action command, and further comprising:

detecting the wake command; and in response to the detecting the wake command, determining based on the priority multimedia input data, that the action command corresponds to the multimedia switching action.

19. The computer-implemented method of claim 15, wherein the received data comprises any of: a user input via remote control, emergency alert data, a phone call, environmental data, a fire detector, an alarm, or a timer.

20. The computer-implemented method of claim 15, wherein the second multimedia signal comprises a combination of the first multimedia signal and a third multimedia signal.

* * * * *